Sept. 12, 1967     P. F. MILLER     3,341,228
QUICK-ACTING HOSE CONNECTION
Filed Sept. 29, 1964     2 Sheets-Sheet 1
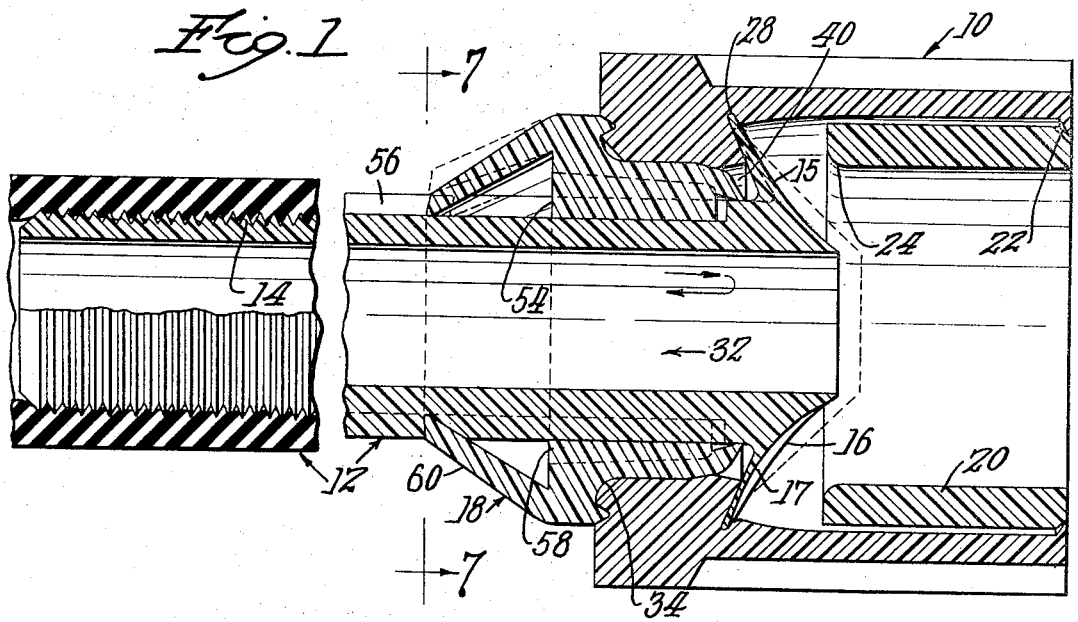
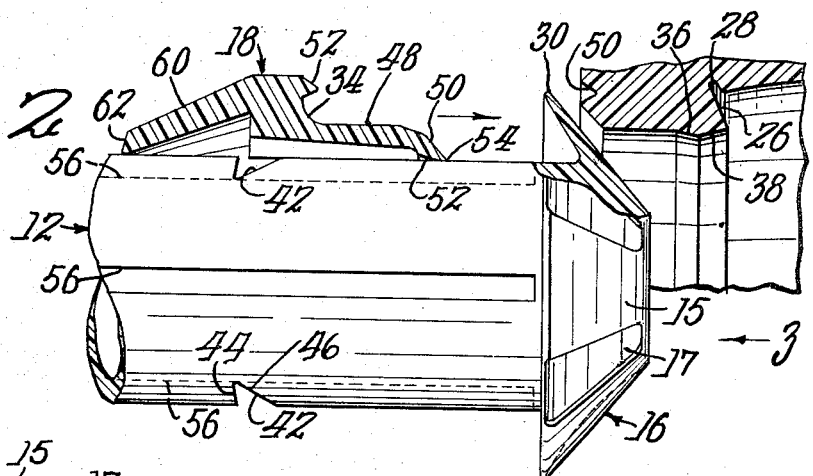
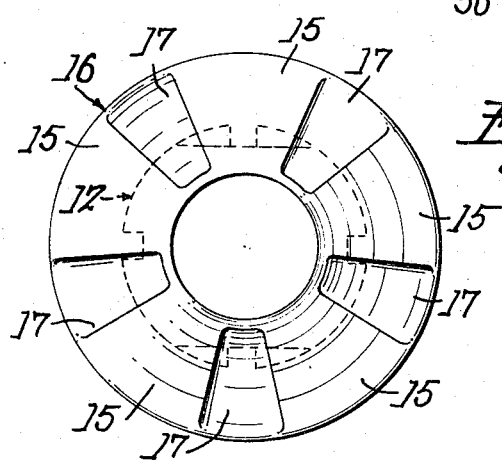
Inventor
Peter F. Miller
By Charles R. Fay,
Attorney

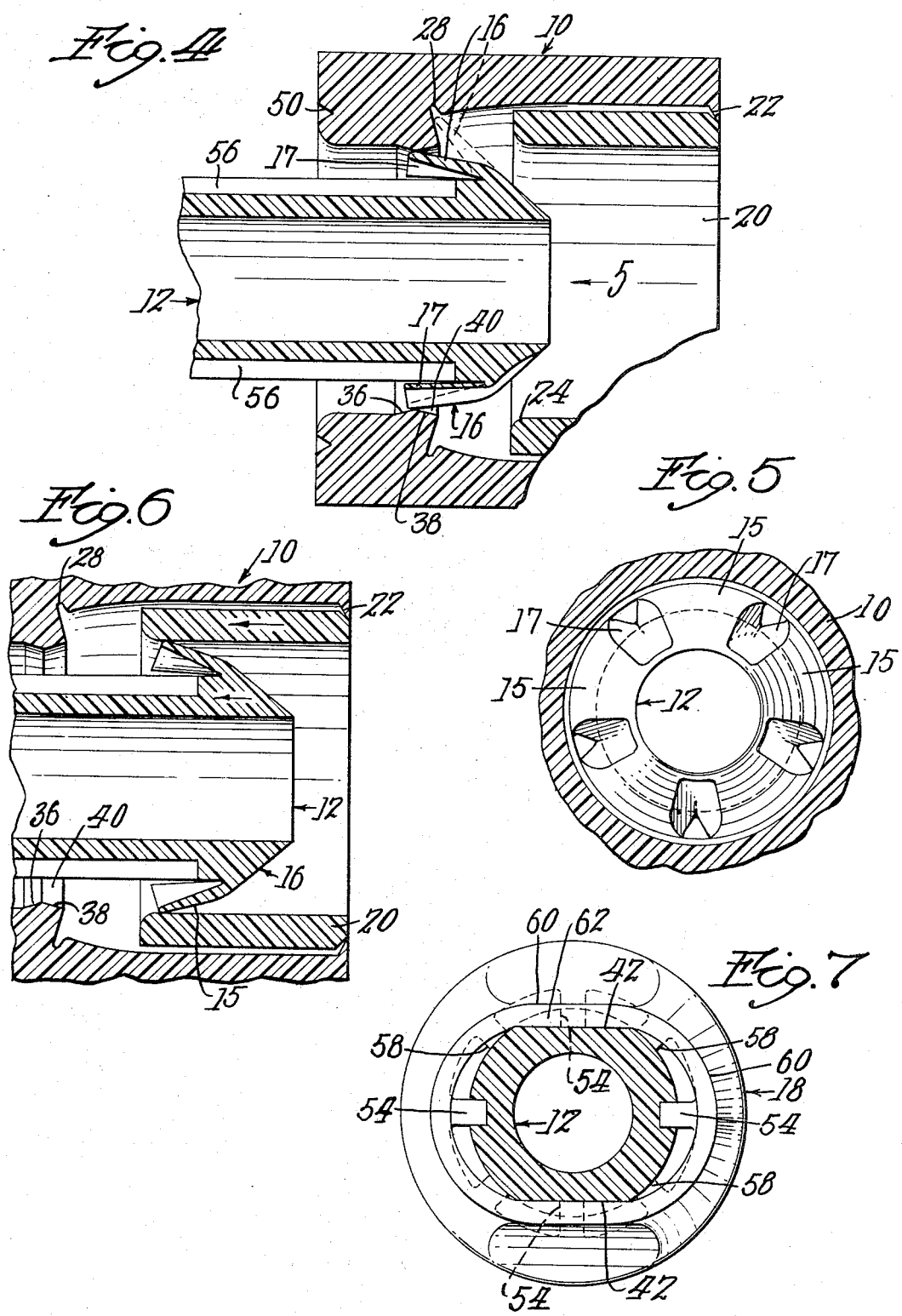

United States Patent Office 3,341,228
Patented Sept. 12, 1967

3,341,228
QUICK-ACTING HOSE CONNECTION
Peter F. Miller, 118 Malburn St.,
Leominster, Mass. 01453
Filed Sept. 29, 1964, Ser. No. 400,172
5 Claims. (Cl. 285—86)

This invention relates to a new and improved quick-acting, completely sealed hose connection, the parts of which are made of plastic which are quickly and easily snapped together for attachment and out for detachment.

One of the principal objects of the invention resides in the provision of a device of this nature which is without fastenings or connections such as screw threads, but is merely snapped in and snapped out with relation to the two main parts thereof which comprise a female housing and a male connecting member to which the hose is secured at one end thereof, the other end of which is provided with a sealing head of semiflexible but self-sustaining nature which contacts an abutment in the housing and completely and fully seals the entire connection against leaking, being held more tightly in sealing relationship therewith the stronger the fluid pressure emanating from the female connection.

Another object of the invention resides in the provision of a floating abutment within the housing which is adapted to be contacted by the sealing head, depressing the latter and moving with it for detachment of the connecting member from the housing.

A further object of the invention relates to a flexible locking member which is also of plastic and locks the male member in its position connected with the housing. This locking member is semi-flexible and in and of itself is a novel part of the combination presented herein. It surrounds the male member and contacts the housing at the opening to the interior thereof, being wedged in position to hold the parts with the aforesaid sealing head in tight abutting relationship with respect to its cooperative abutment but which is at the same time easily manually manipulatable in order to free the same from its locking position to allow the sealing head to be compressed or retracted as above stated with respect to its floating abutment for quick and easy detachment of the parts; and the provision of a locking member of this type which is flexible but also provided with means for holding it in substantially rigid locking position while allowing it to be flexed by the fingers of the user to an unlocked condition.

Other objects and advantages of the invention will appear hereinafter.

Reference is to be had to the accompanying drawings in which:

FIG. 1 is a longitudinal central sectional view showing the parts in connected position;

FIG. 2 is a side elevation showing the parts in detached relation;

FIG. 3 is a view in elevation looking in the direction of arrow 3 in FIG. 2;

FIG. 4 is a sectional view showing the parts as they appear in the act of being attached;

FIG. 5 is a view similar to FIG. 3 showing the parts contracted;

FIG. 6 is a partial view similar to FIG. 1 but showing the parts as they appear while being detached one from the other, and FIG. 7 is a section on line 7—7 of FIG. 2 showing the flexible lock in solid lines in locked condition and in dotted lines in its free condition.

In illustrating the invention there are essentially four main parts. The reference numeral 10 represents generally the female housing which is hollow and may be made in any size or shape, depending upon the circumstances, and may be positioned any place where it is desired as for instance as a common example, the outlet of a faucet or a hose connection. However it is to be understood that this member can be mounted on any kind of container, or it can be utilized for supplying any kind of fluid medium that may be desired in any location.

The connection member is indicated generally by the reference numeral 12 and to this is secured a hose as for instance by means of serrations 14 and a clamp not shown, or by any other desired means. At its inner end, i.e., as respects the housing 10, the member 12 is provided with a flared flexible sealing head generally indicated at 16. This sealing head is in the general shape of a cone, and is substantially continuous and it flares reversely or to the rear as shown. It is deformable or flexible but is self-sustaining. Normally it will sustain itself approximately in the position shown in FIG. 1 but it may be bent in either direction all about the circumference thereof as perhaps is best indicated in FIG. 4. The flared head consists of a series of lands 15 and flutes 17 as best shown in FIG. 3. The flutes 17 are of reduced area to provide folding areas as shown in FIG. 4.

Another main part of the invention is the flexible locking device which is generally indicated by the reference character 18 and this member is utilized to lock the member 12 with the sealing head 16 in substantially the position shown in FIG. 1. This locking device can be released to allow the detachment of member 12 with respect to the housing 10.

Within the housing 10 there is a floating, generally annular sleeve generally indicated by the reference numeral 20. This sleeve forms an abutment at its left-hand end and has an exterior diameter slightly less than the interior diameter of the housing 10. It is held therein by means of continuous or interrupted lip members generally indicated by the numeral 22. Since all the parts are made of selected plastic materials having the characteristics which will best serve the purpose at hand, it will be seen that the annular member 20 can be snapped into the interior of the housing 10 past the projections 22 and is thereby permanently held therein but can move within chamber 10 axially thereof. It is preferably provided with rounded or cam-shaped interior edge at 24 for a purpose to be described.

Within the housing 10 there is another substantially continuous abutment which is indicated at 26. This faces the abutment 20 and is fixed and generally located in spaced relation as shown although of course the abutment 20 may be positioned anywhere within its limit of motion as for instance between the sealing head 16 and the projections 22. The abutment at 26 is preferably provided with a circumferential inwardly directed groove which is indicated at 28 for the purpose of receiving the thin edge 30 of sealing head 16 therein in a very tightly sealing relationship. This can be accomplished either by the flexible locking device 18 or by for instance the fluid pressure in the interior of the housing 10 which is passing in the direction of the arrow at 32. However, it is to be understood that the fluid may move in the opposite direction also if this should be desired and the parts will still be held in sealing relationship.

The housing 10 has an opening to receive the member 12 and this is preferably of annular shape, being relieved as at 34, extending slightly inwardly at 36 and then more abruptly outwardly as at 38, leaving a space in the area 40, this space being generally annular and continuous.

There are a pair of chordal grooves in the exterior surface of the member 12, these grooves being at diametrically opposite points and generally parallel to each other although in exact parallel relationship is not completely necessary. These grooves are indicated at 42, 42 and as shown in FIGS. 1 and 2 they are provided with slanting lines 44, 46 of the shape shown, i.e., providing pockets which flare slightly and extend in an outward and forward direction with respect to member 12.

The flexible locking device 18 is preferably substantially continuous in its forward portion 48 extending inwardly at 50 and terminating in a slanted portion 52 which at the same time provides a more or less forward-most pointed edge at 54. The outer configuration of the portion at 48 is adapted to fit the surface of the opening to the interior of housing 10, see 34, 36, so that these parts closely engage each other as shown in FIG. 1. Also the housing may have an annular groove at 50 for receiving an annular rib 52 integrally associated with the flexible locking means 18 as shown. With the parts in the locking position, the exterior surface of the part 48 of the locking means 18 will be snugly in contact with the interior surface surrounding the opening on the housing 10 to the interior thereof and the rim at 52 helps to position the parts.

The locking device 18 is provided with a series of inwardly directed ribs 54 slidingly associated in comparable grooves 56 extending longitudinally on the outer surface of the member 12 and this maintains the locking member 18 in correct position rotationally with respect to member 12. There are also alternate ribs as at 58 which merely bear on the outside surface of member 12.

Extending to the rear or to the left in FIG. 1 from the main body portion of the member 18, there is a conical converging skirt member generally indicated by the reference numeral 60. This terminates in an edge 62 which conforms to the grooves 42 already described. However in non-locking position, the end rim or edge portion 62 has a diameter slightly exceeding the diameter of the member 12 so that there is no interconnection of the parts. However the skirt 60 is flexible enough so that by means of the operator's fingers, the skirt can be depressed at the top and bottom, so that portions of the edge engage in the notches or grooves 42 and the resiliency of the parts and the configuration and dimensions thereof act to hold the same in locked condition as in the full line showing in FIG. 7. When it is desired to release the flexible lock 18, it is merely gripped by the hand and squeezed laterally and the edge portion 62 pops out of the grooves and frees the locking member 18 from member 12.

When it is desired to couple the parts, the user merely grasps the member 12 and thrusts the sealing head 16 forwardly into the opening in the housing 10 until the sealing head 16 which is retracted or bent to the rear by the surface of the opening as at 34 and 36, moves past the area at 38 and opens up to snap behind abutment 26. When this takes place, the flexible locking means 18 is in position to be manipulated to squeeze it down so as to engage the lip 62 in the diametrically opposed notches 42 as above described. In this condition the device is connected and sealed and the tendency is for the thin edge 30 of the sealing head 16 to enter the groove 28. At the same time any fluid which enters the space 40 will tend to further seal the rim 52 to the outside surface of member 12 and fluid pressure will tend to move the flexible thin edge 30 of the sealing head 16 into the groove 28 as above described. The parts will stay in this position as long as desired.

In order to release the parts, the locking device 18 is manipulated to snap the edges 62 out of the grooves 42 by inward diametrical pressure on the distorted edge portion 62, see FIG. 7. With the lock then free, it is merely necessary for the operator to push the member 12 further forwardly or to the right in FIG. 1 so that it engages the extreme edge portion 24 of the abutment 20. This action causes retraction or folding down of the sealing head 16 and then upon a reverse movement, the friction of the parts causes the abutment 20 to move to the left in FIG. 6 to the FIG. 4 position, with the sealing head, until the edge 30 thereof passes the edge 38, in which position it is clear that the member 18 is easily extracted merely by pulling on it to the left.

Having thus described my invention and the advantages thereof, I do not wish to be limited to the details herein disclosed, otherwise than as set forth in the claims, but what I claim is:

1. A quick detachable self-sealing hose connection comprising a housing having a hollow interior and an opening leading from a substantially planar exterior face to the interior, a pair of spaced substantially continuous internal abutments therein, said abutments facing each other and having a radially relatively enlarged portion therebetween within the housing, a separate member for connection with respect to said housing, said member being elongated and hollow, means to connect a hose at one end thereof, and a distortable self-sustaining semiflexible sealing head on the member adjacent the opposite end thereof for introduction into said housing, said sealing head having an effective diameter which is normally in excess of said abutments, so that it must be compressed in order to pass the abutments, and said head being compressed by the entrance edge opening of the housing until it passes the first abutment encountered and snaps past the same, being held against withdrawal thereby, said sealing head upon engagement with the other abutment being compressed down to a diameter whereby it can be retracted past the first abutment so as to be dislodged and disconnected from said housing, the second-named abutment being movable within the housing and being engaged frictionally with respect to said sealing head so that it is also retracted to a position adjacent the first abutment, a locking device engaging the housing and said member, said locking device being distortable at least in a direction axially of said member, and interengaging means on the member and the distortable part of said locking device, said means acting conjointly to exert a continuous bias on said member, holding the locking device in position against said substantially planar surface of said housing and the sealing head in engagement with said first abutment so that the sealing head and the locking device grip the housing and hold said member in locked position with relation to the housing.

2. The device of claim 1 wherein the distortable part of said locking device being flexible in a direction to release the interengaging means to allow retraction of said member from said housing.

3. The device of claim 1 wherein said interengaging means includes indentations on said member, the distortable part of said locking device including a flexible skirt portion with edges thereof selectively engageable in said indentations and removable therefrom.

4. The device of claim 1 wherein said interengaging means includes indentations on said member, the distortable part of said locking device including a flexible skirt portion with edges thereof selectively engageable in said indentations and removable therefrom, said skirt being deformable from a normal generally annular shape to a distorted oval shape, said indentations being relatively straight-sided in the periphery of said member and receiving the edges of said distorted skirt member therein in locking condition of said flexible locking device with respect to said member.

5. A quick detachable hose connection comprising a housing having an opening leading from a substantially planar exterior face to the interior thereof, a pair of spaced, facing, internal abutments therein one abutment being fixed and the other movable, a separate member, means to connect a hose thereto, said member being hollow and adapted to form a passage between the hose and the interior of the housing, a distortable, self-sustaining, semiflexible sealing head on said member adjacent an end portion thereof, said head extending outwardly from the member and being generally located peripherally thereof and having an effective normal extended diameter greater and a compressed diameter less than those of said abutments, the sealing head being adapted to be compressed by and snap past the fixed abutment to be held thereby and thereby holding the member connected to the housing, and likewise being adapted to be compressed upon engagement with the movable abutment and held thereby to be retracted in the reverse direction past the fixed abutment to disconnect the member from the housing, a locking device engaging the housing and said member, said locking device being distortable at least in a direction axially of said member, and interengaging means on the member and the distortable part of said locking device, said means acting conjointly to exert a continuous bias on said member, holding the locking device in position against said substantially planar surface of said housing and the sealing head in engagement with said first abutment so that the sealing head and the locking member grip the housing and hold said member in locked position with relation to the housing, said interengaging means including indentations on said member, the distortable part of said flexible locking device including a flexible skirt portion with edges thereof selectively engageable in said indentations and removable therefrom, said skirt being deformable from a normal generally annular shape to a distorted oval shape, said indentations being relatively straight-sided in the periphery of said member and receiving the edges of said distorted skirt member therein in locking condition of said locking device with respect to said member.

References Cited

UNITED STATES PATENTS

| | | | |
|---|---|---|---|
| 543,432 | 7/1895 | Thompson | 24—211 |
| 1,165,838 | 12/1915 | Brill | 285—315 X |
| 1,890,348 | 12/1932 | Weatherhead | 85—5 |
| 2,461,427 | 2/1949 | Kneebone. | |
| 2,845,672 | 8/1958 | Molene | 24—213 X |
| 2,850,333 | 9/1958 | Hamman | 287—3 X |
| 3,125,396 | 3/1964 | Bertram | 85—5 X |

FOREIGN PATENTS 10,423  5/1895  Great Britain.

CARL W. TOMLIN, *Primary Examiner.*

R. G. BERKLEY, *Assistant Examiner.*